(12) United States Patent
Shibata

(10) Patent No.: US 11,052,900 B2
(45) Date of Patent: Jul. 6, 2021

(54) HYBRID VEHICLE

(71) Applicant: Toyota Jidosha Kabushiki Kaisha, Toyota (JP)

(72) Inventor: Tomoyuki Shibata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 16/224,048

(22) Filed: Dec. 18, 2018

(65) Prior Publication Data

US 2019/0184973 A1   Jun. 20, 2019

(30) Foreign Application Priority Data

Dec. 20, 2017   (JP) ............................. JP2017-243555

(51) Int. Cl.
| | |
|---|---|
| *B60L 9/00* | (2019.01) |
| *G05D 1/00* | (2006.01) |
| *G05D 3/00* | (2006.01) |
| *G06F 7/00* | (2006.01) |
| *G06F 17/00* | (2019.01) |
| *B60W 20/14* | (2016.01) |
| *B60W 10/18* | (2012.01) |
| *B60W 10/06* | (2006.01) |
| *B60W 10/08* | (2006.01) |
| *B60L 11/12* | (2006.01) |
| *B61C 9/38* | (2006.01) |

(52) U.S. Cl.
CPC ............ *B60W 20/14* (2016.01); *B60W 10/06* (2013.01); *B60W 10/08* (2013.01); *B60W 10/18* (2013.01); *B60W 2510/18* (2013.01); *B60W 2540/10* (2013.01); *B60W 2710/06* (2013.01); *B60W 2710/08* (2013.01)

(58) Field of Classification Search
CPC ...... B60W 20/14; B60W 10/06; B60W 10/08; B60W 10/18; B60W 2510/18; B60W 2540/10; B60W 2710/06; B60W 2710/08; B60L 11/123; B60L 11/1809
USPC ............................................... 701/22; 290/16
See application file for complete search history.

(56) References Cited

U.S. PATENT DOCUMENTS

| | | | |
|---|---|---|---|
| 5,991,911 | A | 11/1999 | Zook |
| 6,052,815 | A | 4/2000 | Zook |
| 6,594,794 | B1 | 7/2003 | De Marzi et al. |
| 2004/0225519 | A1 | 11/2004 | Martin |
| 2005/0021470 | A1 | 1/2005 | Martin et al. |

(Continued)

FOREIGN PATENT DOCUMENTS

| | | |
|---|---|---|
| JP | H09189245 A | 7/1997 |
| JP | H11282701 A | 10/1999 |

(Continued)

*Primary Examiner* — Mahmoud S Ismail
(74) *Attorney, Agent, or Firm* — Dinsmore & Shohl LLP

(57) ABSTRACT

The hybrid vehicle is configured to control an engine and a motor, such that the vehicle is driven in one drive mode among a plurality of drive modes including a Charge Depleting or CD mode in which electric power in a power storage device is consumed and a Charge Sustaining or CS mode in which state of charge of the power storage device is sustained. When a sequential position is selected by a driver in an accelerator-off state, the hybrid vehicle narrows a range of a braking torque applicable to the vehicle in the CD mode as the drive mode, compared with in the CS mode as the drive mode.

5 Claims, 3 Drawing Sheets

(56) References Cited

U.S. PATENT DOCUMENTS

| | | | |
|---|---|---|---|
| 2006/0169892 A1 | 8/2006 | Baba et al. | |
| 2009/0159351 A1* | 6/2009 | Ando | B60L 15/2045 |
| | | | 180/65.265 |
| 2011/0216271 A1 | 9/2011 | Suzuki et al. | |
| 2015/0352962 A1* | 12/2015 | Hokoi | B60W 10/06 |
| | | | 290/16 |

FOREIGN PATENT DOCUMENTS

| | | | |
|---|---|---|---|
| JP | H11282702 | A | 10/1999 |
| JP | 2000214421 | A | 8/2000 |
| JP | 2000214428 | A | 8/2000 |
| JP | 2002501655 | A | 1/2002 |
| JP | 2005209331 | A | 8/2005 |
| JP | 2005243214 | A | 9/2005 |
| JP | 2006234782 | A | 9/2006 |
| JP | 2011258563 | A | 12/2011 |
| JP | 2012502322 | A | 1/2012 |
| JP | 6149806 | B2 | 6/2017 |
| JP | 2017178082 | A | 10/2017 |

\* cited by examiner

HYBRID VEHICLE

CROSS-REFERENCE TO RELATED APPLICATIONS

The present disclosure claims priority to Japanese Patent Application No. 2017-243555 filed Dec. 20, 2017, which is incorporated herein by reference in its entirety including specification, drawings and claims.

TECHNICAL FIELD

The present disclosure relates to a hybrid vehicle and more specifically relates to a hybrid vehicle equipped with an engine, a motor, a power storage device and a shifter.

BACKGROUND

One proposed configuration of a hybrid vehicle includes an engine, a motor (second motor generator) and a power storage device (as described in, for example, Japanese Patent No. 6149806). The engine is configured to output power to a driveshaft that is provided to couple drive wheels. The motor is configured to output power to the drive wheels. The power storage device is configured to transmit electric power to and from the motor. This hybrid vehicle selects one of a plurality of drive modes including a CD (Charge Depleting) mode in which electric power in the power storage device is consumed and a CS (Charge Sustaining) mode in which the state of charge of the power storage device is sustained and controls the engine and the motor, such that the vehicle is driven in the selected drive mode.

SUMMARY

The hybrid vehicle may be equipped with a shifter configured to select one shift position among a plurality of shift positions including a sequential position that allows for a sequential shift operation to change a braking torque applied to the vehicle in an accelerator-off state. In general, when the sequential position is selected by a driver in the accelerator-off state, a required braking torque based on the driver's sequential shift operation is applied to the vehicle by an identical control, whether the drive mode is the CD mode or the CS mode. The driver is, however, likely to expect different vehicle behaviors in the CD mode and in the CS mode as the drive mode. There is accordingly a need to perform different controls in the CD mode and in the CS mode as the drive mode in the case of selection of the sequential position.

A hybrid vehicle of the present disclosure mainly aims to enable different controls to be performed in a CD mode and in a CS mode as a drive mode in the case of selection of a sequential position.

In order to achieve the above primary object, the hybrid vehicle of the present disclosure employs the following configuration.

The present disclosure is directed to a hybrid vehicle. The hybrid vehicle includes an engine configured to output power to a drive shalt coupled with an axle, a motor configured to input and output power from and to the driveshaft, a power storage device configured to transmit electric power to and from the motor, a shifter configured to select one shaft position among a plurality of shift positions including a sequential position that allows for a sequential shift operation to change a braking torque applied to the vehicle in an accelerator-off state, and a control device configured to control the engine and the motor, such that the vehicle is driven in one drive mode among a plurality of drive modes including a Charge Depleting or CD mode in which the electric power in the power storage device is consumed and a Charge Sustaining or CS mode in which state of charge of the power storage device is sustained. When the sequential position is selected by a driver in the accelerator-off state, the control device narrows a range of the braking torque applicable to the vehicle in the CD mode as the drive mode, compared with in the CS mode as the drive mode.

The hybrid vehicle of this aspect controls the engine and the motor, such that the vehicle is driven in one drive mode among the plurality of drive modes including the CD (Charge Depleting) mode in which electric power in the power storage device is consumed and the CS (Charge Sustaining) mode in which the state of charge of the power storage device is sustained. When the sequential position is selected by the driver in the accelerator-off state, the hybrid vehicle of this aspect narrows the range of the braking torque applicable to the vehicle in the CD mode as the drive mode, compared with in the CS mode as the drive mode. When the sequential position is selected by the driver, this configuration enables different controls to be performed in the CD mode and in the CS mode as the drive mode.

DESCRIPTION OF EMBODIMENTS

The following describes some aspects of the disclosure with reference to embodiments.

Figure 1:
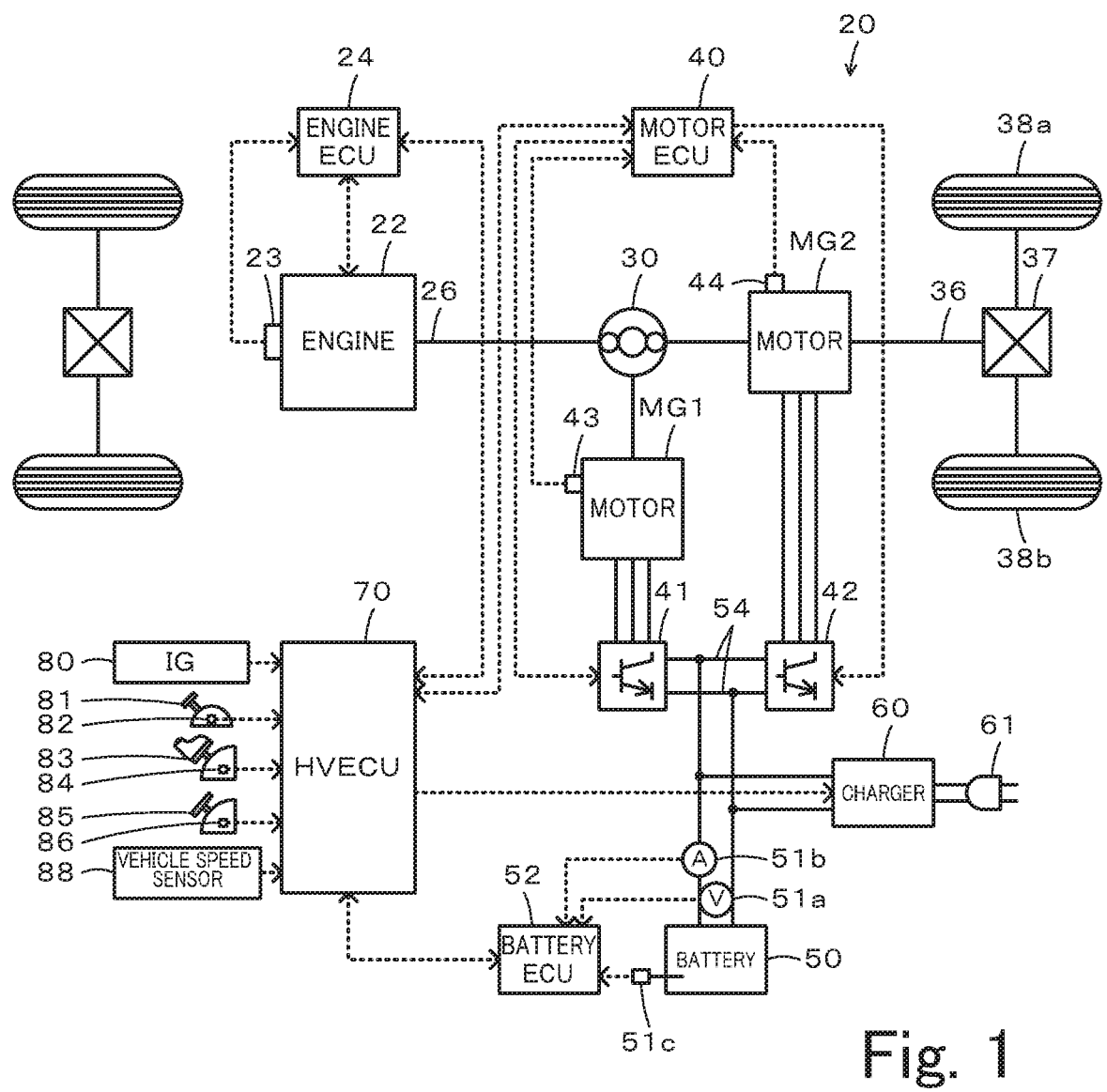
FIG. 1 is a configuration diagram illustrating the schematic configuration of a hybrid vehicle according to an embodiment of the present disclosure.

FIG. 1 is a configuration diagram illustrating the schematic configuration of a hybrid vehicle 20 according to an embodiment of the present disclosure. As illustrated, the hybrid vehicle 20 of the embodiment includes an engine 22, a planetary gear 30, motors MG1 and MG2, inverters 41 and 42, a battery 50, a charger 60, and a hybrid electronic control unit (hereinafter referred as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22, for example, a crank position $\theta cr$ from a crank position sensor 23 configured to detect the rotational position of a crankshaft 26, and a throttle position TH from a throttle valve position sensor configured to detect the position of the throttle valve.

The engine ECU 24 outputs, via its output port, various control signals for operation control of the engine 22, for example, a drive control signal to a throttle motor configured to adjust the position of a throttle valve, a drive control signal to a fuel injection valve and a drive control signal to an ignition coil integrated with an igniter.

The engine ECU 24 is connected with the HVECU 70 via their communication ports to perform operation control of the engine 22 in response to control signals from the HVECU 70 and output data regarding the operating conditions of the engine 22 to the HVECU 70 as appropriate. The engine ECU 24 computes the rotation speed of the crankshaft 26, which is equal to a rotation speed Ne of the engine 22, based on the crank position θcr detected by the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 38a and 38b via a differential gear 37. The planetary gear 30 also includes a carrier that is connected with the crankshaft 26 of the engine 22.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are connected with the battery 50 via power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input into the motor ECU 40 include, for example, rotational positions θm1 and θm2 from rotational position detection sensors 43 and 44 configured to detect the rotational positions of the rotors of the motors MG1 and MG2. The input signals also include phase currents from current sensors configured to detect electric currents flowing in respective phases of the motors MG1 and MG2.

The motor ECU 40 output, for example, switching control signals to the plurality of switching elements (not shown) included in the respective inverters 41 and 42. The motor ECU 40 is connected with the HVECU 70 via the respective communication ports to drive and control the motors MG1 and MG2, in response to control signals from the HVECU 70 and to output data regarding the driving conditions of the motors MG1 and MG2 to the HVECU 70 as needed basis. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured, for example, as a lithium ion secondary battery or a nickel metal hydride secondary battery. This battery 50 is connected with the inverters 41 and 42 via the power lines 54 as described above. The battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50.

The battery ECU 52 is connected with the HVECU 70 via the respective communication ports to output data regarding the conditions of the battery 50 to the HVECU 70 as needed basis. The battery ECU 52 calculates a state of charge SOC, based on an integrated value of the battery current Ib input from the current sensor 51b. The state of charge SOC denotes a ratio of the capacity of electric power dischargeable from the battery 50 to the overall capacity of the battery 50. The battery ECU 52 also calculates an input limit Win and an output limit Wout, based on the calculated state of charge SOC and the battery temperature Tb input from the temperature sensor 51c. The input limit Win denotes a maximum allowable power (negative value) that is allowed to charge the battery 50, and the output limit Wout denotes a maximum allowable power (positive value) that is allowed to be discharged from the battery 50.

The charger 60 is connected with the power lines 54 and is configured to charge the battery 50 with electric power from an external power supply such as a domestic power supply when a power plug 61 is connected with the external power supply. This charger 60 includes an AC-DC converter and a DC-DC converter. The AC-DC converter serves to convert AC power from the external power supply that is supplied via the power plug 61, into DC power. The DC-DC converter serves to convert a voltage of the DC power from the AC-DC converter and supply the DC power of the converted voltage to the battery 50. When the power plug 61 is connected with the external power supply, the HVECU 70 controls the AC-DC converter and the DC-DC converter, so that the charger 60 supplies the electric power from the external power supply to the battery 50.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 obtains signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85.

The HVECU 70 outputs, for example, a control signal to the charger 60 via the output port. The HVECU 70 is connected with the engine ECU 24, the motor ECU 40 and the battery ECU 52 via the respective communication ports as described above to transmit various control signals and data to and from the engine ECU 24, the motor ECU 40 and the battery ECU 52.

The hybrid vehicle 20 of the embodiment having the above configuration may be driven by a hybrid drive (HV drive) or driven by a motor drive (EV drive). The HV drive causes the hybrid vehicle 20 to run with operation of the engine 22. The EV drive causes the hybrid vehicle 20 to run with stop of operation of the engine 22.

In the hybrid vehicle 20 of the embodiment, a sequential shift position (S position) having an upshift instruction position and a downshift instruction position is provided as the shift position SP of the shift lever 81, in addition to a parking position (P position) used for parking, a reverse position (R position) for reverse driving, a neutral position (N position) for neutral, and a general drive position (D position) for forward driving. The S position herein denotes a position used to change the driving force in an accelerator-on state or the braking torque in an accelerator-off state during a run in, for example, five speeds (S1 to S5). More specifically, at the shift position SP set to the S position, every upshift in response to each operation of the upshift instruction position decreases the driving force in the accelerator-on state the braking torque in the accelerator-off state during a run. Every downshift in response to each operation of the downshift instruction position, on the other hand, increases the driving force in the accelerator-on state or the braking torque in the accelerator-off state during a run. In the description below, the operation of the upshift instruction position or the operation or the downshift instruction position is called "sequential shift operation". The S position gives the driver a gearshift feeling by a virtual stepped transmission, in response to the driver's operation of the shift lever 81.

Additionally, in the hybrid vehicle 20 of the embodiment, in a system-off state at home or at a charging point set in advance, the HVECU 70 controls the charger 60 to charge the battery 50 with the electric power from an external power supply to a full charge level or a predetermined charge level that is slightly lower than the full charge level, in response to input of a connection detection signal from a connection detection sensor (i.e., in response to connection of the power plug 61 to the external power supply). On a system start after charging of the battery 50, the hybrid vehicle 20 is driven in a CD mode (Charge Depleting mode) in which priority is given to reduction in the state of charge SOC of the battery 50 until the state of charge SOC of the battery 50 becomes equal to or lower than a threshold value Shv (for example, 25%, 30% or 35%), and is driven in a CS mode (Charge Sustaining mode) in which the state of charge SOC of the battery 50 is sustained after the state of charge SOC of the battery 50 becomes equal to or lower than the threshold value Shv. According to the embodiment, in the CD mode, priority is given to the EV drive over the HV drive. In the CS mode, on the other hand, priority is given to the HV drive over the EV drive.

Figure 2:
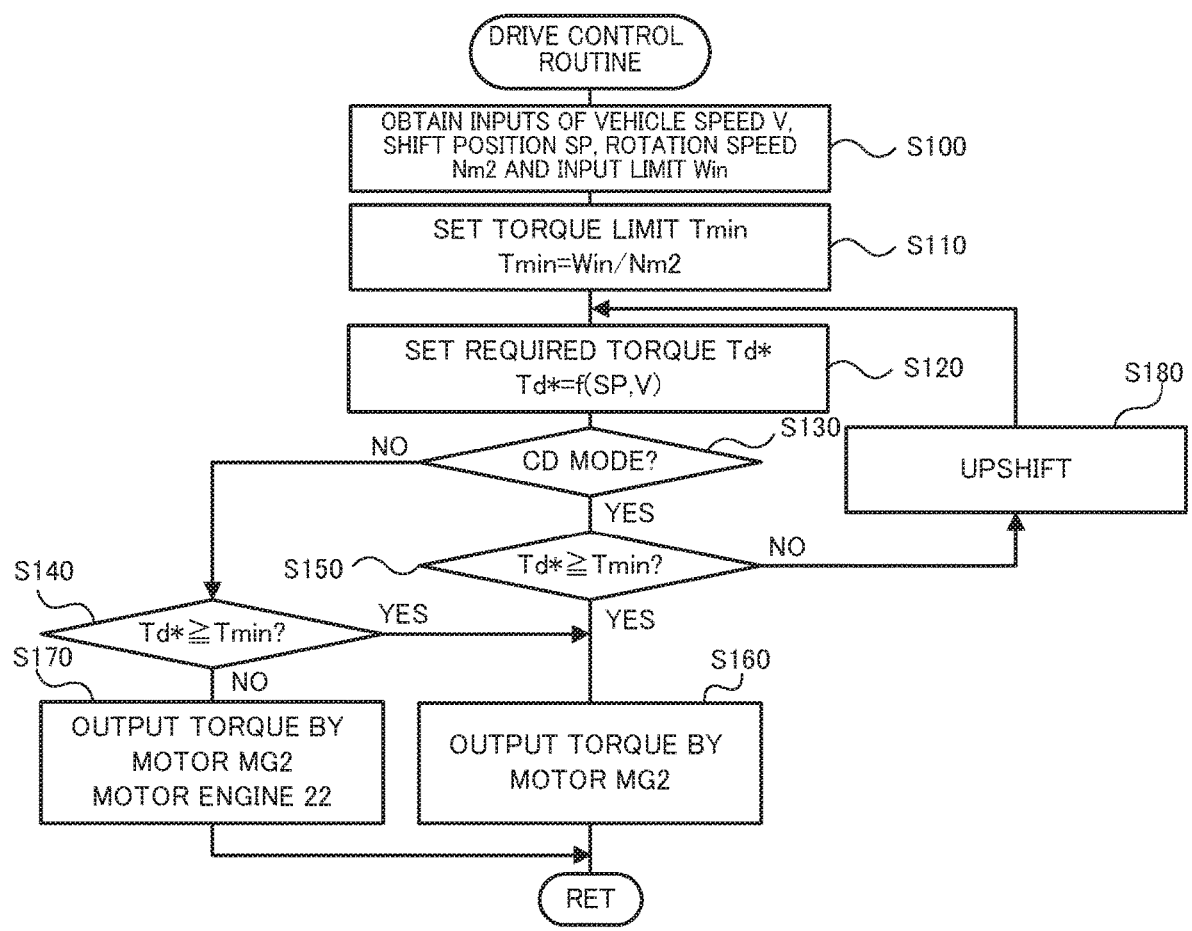
FIG. 2 is a flowchart showing one example of a drive control routine performed by the HVECU according to the embodiment.

The following describes operations of the hybrid vehicle 20 having the configuration described above or more specifically a series of operations when both the accelerator pedal 83 and the brake pedal 85 are off at the S position. FIG. 2 is a flowchart showing one example of a drive control routine performed by the HVECU 70 according to the embodiment. This routine is performed repeatedly when both the accelerator pedal 83 and the brake pedal 85 are off at the S position.

When this routine is triggered, the CPU (not shown) of the HVECU 70 first performs an input process of the vehicle speed V from the vehicle speed sensor 88, the shift position SP (one of S1 to S5) from the shift position sensor 82, the rotation speed Nm2 of the motor MG2 and the input limit Win (step S100). The rotation speed Nm2 of the motor MG2 is calculated by the motor ECU 40 based on the rotational position θm2 from the rotational position detection sensor 44 and is input from the motor ECU 40 by communication. The input limit Win is calculated by the battery ECU 52 based on the state of charge SOC and the battery temperature Tb and is input from the battery ECU 52 by communication.

The CPU subsequently divides the input limit Win by the rotation speed Nm2 of the motor MG2 and sets the result of division to a torque limit Tmin (negative value) that denotes a lower limit value of torque output from the motor MG2 in the range of the input limit Win (step S110).

Figure 3:
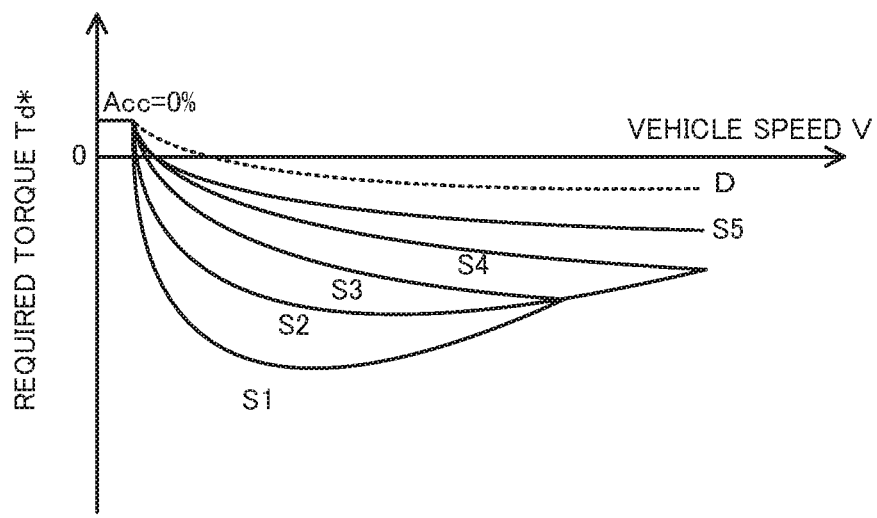
FIG. 3 is one example of the required torque setting map in the accelerator-off state (having the accelerator position Acc set to a value 0) at the shift position SP set to the S position.

The CPU subsequently sets a required torque Td* that is required for the vehicle, based on the vehicle speed V and the shift position SP (step S120). According to the embodiment, a relationship between the vehicle speed V, the shift position SP and the required torque Td* is determined in advance and is stored as a required torque setting map in the ROM (not shown). A required torque Td* corresponding to a given vehicle speed V and a given shift position SP is read from the stored map to be set. One example of the required torque setting map in the accelerator-off state (having the accelerator position Acc set to a value 0) at the shift position SP set to the S position is shown in FIG. 3. A negative value of the required torque Td* means requirement for a braking torque. In FIG. 3, solid line curves show variations in required torque Td* at the shift position SP set to the S position. For the purpose of comparison, a broken line curve shows a variation in required torque Td* at the shift position SP set to the D position.

The CPU then determines whether the drive mode is the CD mode (step S130). When the drive mode is not the CD mode, i.e., when the drive mode is the CS mode, the CPU subsequently determines whether the required torque Td* is equal to or larger than the torque limit Tmin (step S140).

When it is determined at step S140 that the required torque Td* is equal to or larger than the torque limit Tmin, the CPU controls the engine 22 and the motors MG1 and MG2 to cause the required torque Td* to be output to the driveshaft 36 by a driving torque or a regenerative braking torque output from the motor MG2 (step S160) and then terminates this routine. More specifically, at step S160, the CPU sends a fuel cutoff command to the engine ECU 24. The CPU also sets a value 0 to a torque command Tm1* of the motor MG1, sets the required torque Td* to a torque command Tm2* of the motor MG2, and sends the torque commands Tm1* and Tm2* to the motor ECU 40. When receiving the fuel cutoff command, the engine ECU 24 stops fuel injection control of the engine 22. When receiving the torque commands Tm1* and Tm2*, the motor ECU 40 controls the motors MG1 and MG2 to be driven with the torque commands Tm1* and Tm2*. Such control enables the required torque Td* (braking torque when the required torque Td* has a negative value) based on the shift position SP (one of S1 to S5) in response to the driver's sequential operation to be output to the driveshaft 36 by the driving torque or the regenerative braking torque output from the motor MG2.

When it is determined at step S140 that the required torque Td* is smaller than the torque limit Tmin or more specifically when the required torque Td* has a negative value and a required braking torque |Td*| that is an absolute value of the required torque Td* is larger than an upper limit value |Tmin| or the regenerative braking torque that is an absolute value of the torque limit Tmin, on the other hand, the CPU controls the engine 22 and the motors MG1 and MG2, such that the required torque Td* is output to the driveshaft 36 by the torque output from the motor MG2 and the braking torque that is generated when the engine 22 is motored in the cutoff state of fuel supply (step S170) and then terminates this routine. More specifically, at step S170, the CPU sends the fuel cutoff command to the engine ECU 24. The CPU also sets a motoring rotation speed Nref of the engine 22 using the vehicle speed V, and sets a torque required to motor the engine 22 at the motoring rotation speed Nref, to the torque command Tm1* of the motor MG1. The CPU further sets the, torque command Tm2* of the motor MG2, based on the required torque Td* and the torque command Tm1* (Tm2*=Td*±Tm1*/ρ), such that the required torque Td* is output to the driveshaft 36. The CPU subsequently sends the set torque commands Tm1* and Tm2* to the motor ECU 40. When receiving the fuel cutoff command, the engine ECU 24 stops fuel injection control of the engine 22. When receiving the torque commands Tm1* and Tm2*, the motor ECU 40 controls the motors MG1 and MG2 to be driven with the torque commands Tm1* and Tm2*. Such control enables the required torque Td* (braking torque) based on the shift position SP (one of S1 to S5) in response to the driver's sequential operation to be output to the driveshaft 36 by the braking torque (friction torque), which is generated when the engine 22 is motored by the motor MG1 in the stop state of fuel supply to the engine 22, and the regenerative braking torque from the motor MG2.

When the drive mode is the CD mode at step S130, the CPU subsequently (determines whether the required torque Td* is equal to or larger than the torque limit Tmin (step S150).

When it is determined at step S150 that the required torque Td* is equal to or larger than the torque limit Tmin, the CPU proceeds to step S160 to control the engine 22 and the motors MG1 and MG2 such as to cause the required torque Td* to be output to the driveshaft 36 by the driving torque or the regenerative braking torque output from the motor MG2 and then terminates this routine. Such control enables the required torque Td* (braking torque when the required torque Td* has a negative value) based on the shift position SP (one of S1 to S5) in response to the driver's sequential operation to be output to the driveshaft 36 by the driving torque or the regenerative braking torque output from the motor MG2.

When it is determined at step S150 that the required torque Td* is smaller than the torque limit Tmin or more specifically when the required torque Td* has a negative value and the required braking torque |Td*| that is the absolute value of the required torque Td* is larger than the upper limit value |Tmin| of the regenerative braking torque that is the absolute value of the torque limit Tmin, on the other hand, the CPU upshifts the shift position SP (one of S1 to S5) by one speed (step S180) and then returns to step S120 to set the required torque Td* that is required for the vehicle, based on the vehicle speed V and the upshifted shift position SP. This series of processing sets a larger torque than the torque prior to the upshift (smaller torque as the braking torque), to the required torque Td*. The processing of steps S150, S180, S120 and S130 is repeated until the required torque Td* becomes equal to or larger than the torque limit Tmin. Accordingly, the shift position SP is upshifted from the shift position SP in response to the driver's sequential shift operation until the required torque Td* becomes equal to or larger than the torque limit Tmin.

When it is determined at step S150 that the required torque Td* is equal to or larger than the torque limit Tmin, the CPU proceeds to step S160 to control the engine 22 and the motors MG1 and MG2 such as to cause the required torque Td* to be output to the driveshaft 36 by the driving torque or the regenerative braking torque output from the motor MG2 and then terminates this routine. At the shift position SP set to the S position, in the CS mode as the drive mode, even when the required torque Td* based on the shift position SP (one of S1 to S5) in response to the driver's sequential shift operation input at step S100 is smaller than the torque limit Tmin, this series of processing controls the motors MG1 and MG2 and the engine 22 to cause the required torque Td* to be output to the driveshaft 36. In the CD mode as the drive mode, on the other hand, when the required torque Td* based on the shift position SP (one of S1 to S5) in response to the driver's sequential shift operation input at step S100 is smaller than the torque limit Tmin, this series of processing upshifts the shift position SP until the required torque Td* becomes equal to or larger than the torque limit Tmin and then controls the motors MG1 and MG2 and the engine 22 to cause the required torque Td* based on the shifted shift position SP to be output to the driveshaft 36. This narrows the range of the torque (braking torque when the required torque Td* has a negative value) applicable to the vehicle in the CD mode, compared with in the CS mode. This configuration allows different controls to be performed in the CD mode and in the CS mode as the drive mode at the shift position SP set to the S position (S1 to S5) and thereby suppresses the driver from feeling strange.

As described above, when the S position is selected by the driver in the accelerator-off state, the hybrid vehicle 20 of the embodiment narrows the range of the torque (braking torque when the required torque Td* has a negative value) applicable to the vehicle in the CD mode as the drive mode, compared with in the CS mode as the drive mode. This configuration allows different controls to be performed in the CD mode and in the CS mode as the drive mode.

In the CD mode as the drive mode, the hybrid vehicle 20 of the embodiment sets the required torque Td* to be equal to or larger than the torque limit Tmin or, in other words, causes the range of the braking torque applicable to the vehicle to be the range of not larger than the upper limit value |Tmin|. The braking torque can thus be applied to the vehicle by driving the motor MG2 in the range of the braking torque that is allowed to be output from the motor MG2.

Furthermore, in the CD mode as the drive mode, when the required torque Td* based on the driver's sequential shift operation is smaller than the torque limit Tmin, i.e., when the required braking torque |Td*| is larger than the upper limit value |Tmin| of the braking torque, the shift position SP is upshifted, irrespective of the driver's sequential shift operation. This narrows the range of the torque (braking torque when the required torque Td* has a negative value) applicable to the vehicle in the CD mode as the drive mode, compared with in the CS mode as the drive mode.

The hybrid vehicle 20 of the embodiment compares the required torque Td* with the torque limit Tmin at step S140 or at step S150. According to a modification, a torque to be compared with the required torque Td* may be a torque slightly smaller than the torque limit Tmin or a rated torque of the motor MG2, in place of the torque limit Tmin.

The hybrid vehicle 20 of the embodiment upshifts the shift position SP at step S180 when the required torque Td* is smaller than the torque limit Tmin at step S150. A modification may set a torque larger than the torque limit Tmin to the torque command Tm2* of the motor MG2 and may control the motor MG2 to be driven with the torque command Tm2*.

The hybrid vehicle 20 of the embodiment uses the battery 50 configured by, for example, a lithium ion rechargeable battery or a nickel metal hydride battery, as the power storage device. Another device that is capable of accumulating electric power, for example, a capacitor, may be employed as the power storage device.

Figure 4:
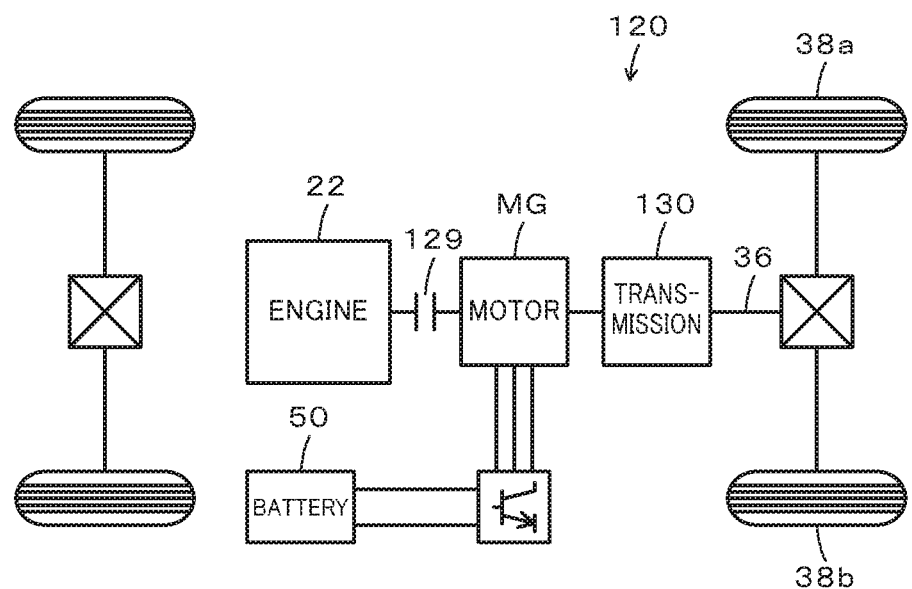
FIG. 4 is a configuration diagram illustrating the schematic configuration of a hybrid vehicle according to a modification.

The hybrid vehicle 20 of the embodiment is configured such that the engine 22 and the motor MG1 are connected via the planetary gear 30 with the driveshaft 36 coupled with the drive wheels 38a and 38b and that the motor MG2 is connected with the driveshaft 36. The present disclosure may, however, be also applied to a hybrid vehicle 120 of a modification configured such that a motor MG serving to generate electric power is connected via a transmission 130 with a driveshaft 36 coupled with drive wheels 38a and 38b and that an engine 22 is connected via a clutch 129 with a rotating shaft of the motor MG as shown in FIG. 4.

In the hybrid vehicle of this aspect, the range of the braking torque applicable to the vehicle in the CD mode as the drive mode may be a range of the braking torque that is allowed to be output from the motor. When the drive mode is the CD mode, this configuration causes the motor to be driven in the range of the braking torque that allows to be output from the motor and thereby enables the braking torque to be applied to the vehicle.

In the hybrid vehicle of another aspect, the sequential shift operation may include an operation of changing the braking torque in the accelerator-off state into a stage corresponding to one of a plurality of virtual speeds by an upshift instruction or a downshift instruction, and the control device may reduce a required braking torque at a higher speed to be lower than the required braking torque at a lower speed, and at the sequential position selected by the driver in the accelerator-off state and in the CD mode as the drive mode, when the required braking torque based on the driver's sequential shift operation is larger than an upper limit of the range of the braking torque selectable in the CD mode as the drive mode, the control device may upshift the speed, irrespective of the driver's sequential shift operation. When the sequential position is selected by the driver in the accelerator-off state, this configuration narrows the range of the braking torque applicable to the vehicle in the CD mode as the drive mode, compared with in the CS mode as the drive mode.

In the hybrid vehicle of another aspect, at the sequential position selected by the driver in the accelerator-off state and in the CD mode as the drive mode, when a required braking torque based on the driver's sequential shift operation is larger than an upper limit of the range of the braking torque selectable in the CD mode as the drive mode, the control device may control the engine and the motor such that a braking torque smaller than the required braking torque is applied to the vehicle. When the sequential position is selected by the driver in the accelerator-off state, this configuration narrows the range of the braking torque applicable to the vehicle in the CD mode as the drive mode, compared with in the CS mode as the drive mode.

The following describes the correspondence relationship between the primary components of the embodiment and the primary components of the disclosure described in Summary. The engine 22 of the embodiment corresponds to the "engine", the motor MG2 of the embodiment corresponds to the "motor", the battery 50 corresponds to the "power storage device", and the shift lever 81 of the embodiment corresponds to the "shifter". The engine ECU 24, the motor ECU 40 and the HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the hybrid vehicle and so on.

The invention claimed is:
1. A hybrid vehicle, comprising:
an engine configured to output power to a driveshaft coupled with an axle;
a motor configured to input and output power from and to the driveshaft;
a power storage device configured to transmit electric power to and from the motor;
a shifter configured to select one shift position among a plurality of shift positions including a sequential position that allows for a sequential shift operation to change a braking torque applied to the vehicle in an accelerator-off state; and
a control device configured to control the engine and the motor, such that the vehicle is driven in one drive mode among a plurality of drive modes including a Charge Depleting or CD mode in which the electric power in the power storage device is consumed and a Charge Sustaining or CS mode in which state of charge of the power storage device is sustained, wherein:
when the sequential position is selected by a driver in the accelerator-off state, the control device narrows a range of the braking torque applicable to the vehicle in the CD mode as the drive mode, compared with in the CS mode as the drive mode,
the sequential shift operation comprises an operation of changing the braking torque in the accelerator-off state into a stage corresponding to one of a plurality of virtual speeds by an upshift instruction or a downshift instruction,
the control device reduces a required braking torque at a higher speed to be lower than the required braking torque at a lower speed, and
at the sequential position selected by the driver in the accelerator-off state and in the CD mode as the drive mode, when the required braking torque based on the driver's sequential shift operation is larger than an upper limit of the range of the braking torque selectable in the CD mode as the drive mode, the control device upshifts the speed, irrespective of the driver's sequential shift operation.

2. The hybrid vehicle according to claim 1, wherein the range of the braking torque applicable to the vehicle in the CD mode as the drive mode is a range of the braking torque that is allowed to be output from the motor.

3. The hybrid vehicle according to claim 1, wherein at the sequential position selected by the driver in the accelerator-off state and in the CD mode as the drive mode, when a required braking torque based on the driver's sequential shift operation is larger than an upper limit of the range of the braking torque selectable in the CD mode as the drive mode, the control device controls the engine and the motor such that a braking torque smaller than the required braking torque is applied to the vehicle.

4. A hybrid vehicle, comprising:
an engine configured to output power to a driveshaft coupled with an axle;
a motor configured to input and output power from and to the driveshaft;
a power storage device configured to transmit electric power to and from the motor;
a shifter configured to select one shift position among a plurality of shift positions including a sequential position that allows for a sequential shift operation to change a braking torque applied to the vehicle in an accelerator-off state; and
a control device configured to control the engine and the motor, such that the vehicle is driven in one drive mode among a plurality of drive modes including a Charge Depleting or CD mode in which the electric power in the power storage device is consumed and a Charge Sustaining or CS mode in which state of charge of the power storage device is sustained, wherein when the sequential position is selected by a driver in the accelerator-off state, the control device narrows a range of the braking torque applicable to the vehicle in the CD mode as the drive mode, compared with in the CS mode as the drive mode, and wherein at the sequential position selected by the driver in the accelerator-off state and in the CD mode as the drive mode, when a required braking torque based on the driver's sequential shift operation is larger than an upper limit of the range of the braking torque selectable in the CD mode as the drive mode, the control device controls the engine and the motor such that a braking torque smaller than the required braking torque is applied to the vehicle.

5. The hybrid vehicle according to claim 4, wherein the range of the braking torque applicable to the vehicle in the CD mode as the drive mode is a range of the braking torque that is allowed to be output from the motor.

* * * * *